FREQUENCY SENSITIVE DISCRIMINATOR SYSTEM

Filed Nov. 27, 1963 2 Sheets-Sheet 1

INVENTOR.
JOEL H. AXE
BY Allen M. Sutton
ATTORNEY

Oct. 25, 1966 J. H. AXE 3,281,701

FREQUENCY SENSITIVE DISCRIMINATOR SYSTEM

Filed Nov. 27, 1963 2 Sheets-Sheet 2

INVENTOR.
JOEL H. AXE
BY Allen M. Sutton
ATTORNEY

United States Patent Office 3,281,701
Patented Oct. 25, 1966

3,281,701
FREQUENCY SENSITIVE DISCRIMINATOR SYSTEM

Joel H. Axe, Los Angeles, Calif., assignor, by mesne assignments, to The Bunker-Ramo Corporation, Stamford, Conn., a corporation of Delaware Filed Nov. 27, 1963, Ser. No. 326,535
15 Claims. (Cl. 329—142)

This invention relates to electrical, frequency sensitive systems and, more particularly, to a system which accepts variable frequency input signals and provides direct current output signals, whose presence, absence and, in some cases, amplitudes, are related to the frequencies of the input signals. Furthermore, the apparatus of the invention obtains excellent frequency selectivity and yet embodies low "Q" circuitry; i.e., circuitry having a low ratio of reactance to effective resistance.

The present invention may be thought of as similar to a highly selective frequency sensitive filter whose output is a rectified direct current signal. Such combinations are useful in remote control operations where radio receiving systems are utilized to receive and cause a response to various commands which are represented by the presence or absence of signals having various predetermined frequencies. The present invention is also useful whenever a rectified direct current signal, whose amplitude and polarity are functions of frequency, is desired.

According to the teachings disclosed hereinafter, the present invention may incorporate conventional alternating current amplifying devices whose outputs are substantially similar to the output signals of frequency filters and other frequency discriminating networks.

Broadly speaking, a frequency filter is a device which eliminates or reduces certain frequencies of an alternating current input signal while leaving others relatively unchanged. For example, a low-pass filter is a device which transmits all frequencies of an input signal from zero frequency up to a critical or cutoff frequency with substantially negligible attenuation, while filtering out frequencies beyond the critical frequency by attenuating them by up to 100% of their amplitude. The rate of attenuation of a filter as a function of frequency is usually referred to as the filter's cutoff sharpness.

The utility of filters is now so well established in the electronics art that specific examples are hardly necessary here, except to observe that the specific nature of the application and such other factors as precision and reliability have had a marked effect on the cost and the design trends in this art. For example, filters with sharp cutoffs are usually complex and employ components having high Q characteristics, which greatly increase the cost of the device. Generally it can be stated that the design problems and the cost of components of filter devices usually increase as the separation in frequency decreases between those frequencies that it is desired to pass unattenuated and those frequencies that it is desired to eliminate or greatly reduce. The present invention greatly reduces the cost and complexity of relatively sharp cutoff filtering devices by providing a simple device which comprises relatively inexpensive low Q components for discriminating accurately between frequencies in the frequency spectrum.

Basically, the present invention is based on the coincidental energization of tuned networks whose output signals are rectified, summed and filtered so as to produce rectified direct current output signals whose characteristics are a function of the frequency of a signal which energizes the tuned networks.

One embodiment of the present invention incorporates two tuned circuits which have predetermined signal transmission characteristics. The two circuits, which are coincidently driven by an input signal, are so arranged that their respective coincident output signals of opposite polarity are supplied to adding circuitry whose output signal in turn is indicative of the frequency of the input signals as a function of the transmission characteristics of the two tuned circuits. It is apparent that if the frequency of the input signal is such that, as it is transmitted by the two tuned circuits, their rectified output signals are equal but of opposite polarity, their sum will be substantially zero. However, as the frequency of the input signal varies, the rectified output signals of the two tuned circuits will vary, resulting in a rectified output signal from the adding circuitry whose amplitude and polarity are functions of the frequency of the input signal. It is apparent to one familiar with the art that since the adding circuitry referred to hereinbefore adds rectified output signals of the two tuned circuits rather than alternating current output signals, phase cancellation of the two alternating current output signals, which is generally quite complex due to the continually varying phase relationship, is unnecessary. Such an arrangement results in a simplified filtering circuit which produces a minimum of time delay between the input signal to the system and its rectified output signal whose amplitude is a function of the input signal frequency.

If alternating current (A.C.) output signals rather than direct current (D.C.) output signals are desired, the D.C. output signals of varying amplitudes may be used to control the operation of an amplifier, which is also energized by the A.C. input signals so that the A.C. output signals of the amplifiers comprise only preselected frequencies.

The tuned circuits referred to may be replaced by other circuits having predetermined transmission characteristics so that the over-all frequency selectivity capabilities of the device of the present invention may further be increased.

Additional features and advantages, which will subsequently become apparent, reside in the novel circuitry and mode of operation of the device as more fully hereinafter described, further reference being made to the accompanying drawings forming a part hereof, in which:

FIGURES 1(*a*), 1(*b*) and 1(*c*) are waveshape diagrams helpful in explaining the underlying principles of the present invention;

Figure 1A:
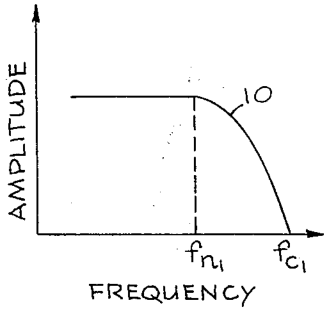
Figure 1B:
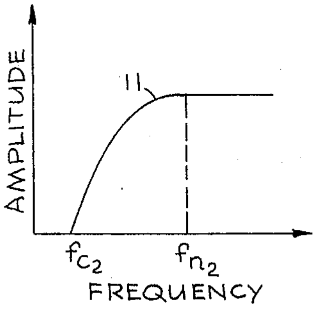
Figure 1C:
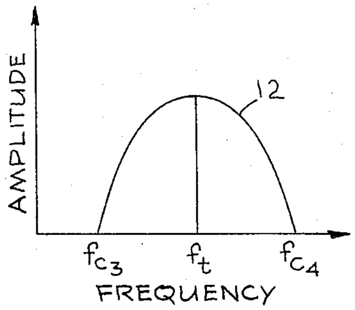

In order to better understand the operations of the several embodiments of the present invention and more fully appreciate the advantages thereof, reference is made to FIGS. 1(*a*), 1(*b*) and 1(*c*) which diagrammatically represent the frequency transmission characteristics of a conventional low-pass filter, a high-pass filter and a tuned circuit, respectively. As seen in FIG. 1(*a*), the low-pass filter transmits all frequencies below a nominal critical frequency $fn_1$ with substantially zero attenuation as shown by the horizontal portion of the line 10, while all frequencies above a cutoff frequency are eliminated. The frequencies between $fn_1$ and $fc_1$ are increasingly attenuated, the rate of attenuation being defined as the filter's cutoff sharpness. Similarly, the cutoff sharpness of a high-pass filter, whose transmission characteristics are represented by line 11 in FIG. 1(*b*), is defined by the sloping portion of the line 11 between the nominal critical frequency $fn_2$ and the cutoff frequency $fc_2$. In FIG. 1(*c*), the frequency transmission characteristic of a conventional tuned circuit is designated by the numeral 12, the tuning frequency being designated as $f_t$ and the lower and upper cutoff frequencies as $fc_3$ and $fc_4$, respectively.

As is well known in the art, the cutoff sharpness of any frequency selective network having unique transmission characteristics, such as the networks referred to above, greatly depends on the complexity of the network and the Q characteristics of the components used in constructing it, the higher the components' Q, the sharper the frequency cutoff. However, by incorporating a device designed according to the teachings of the present invention, it is possible to greatly increase the sharpness of filter cutoff, yet use a simple device comprised of relatively inexpensive low Q components.

Figure 2:
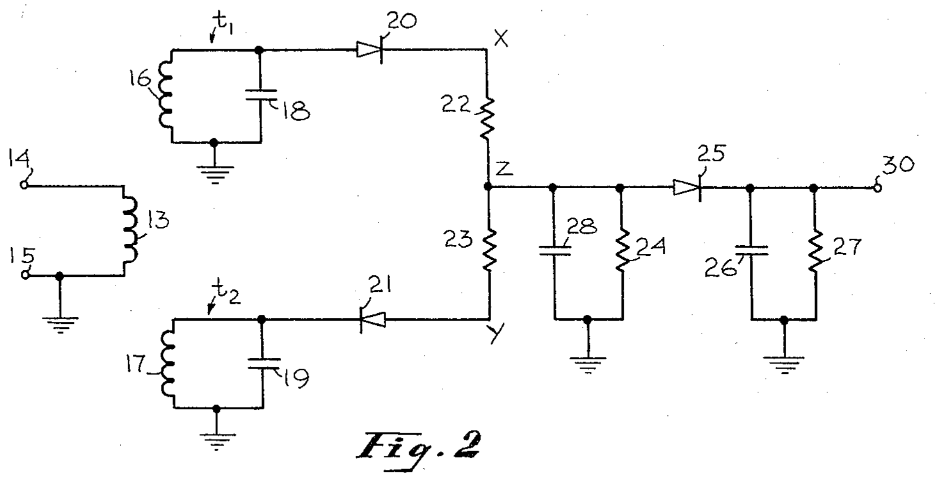
FIG. 2 is a schematic diagram of one embodiment of the invention.

FIG. 2 is a schematic representation of one embodiment of the invention, where a primary input winding 13 of, for example, an air core transformer, is connected between input terminals 14 and 15, terminal 15 being grounded. Two tank circuits, generally designated $t_1$ and $t_2$, are included in the embodiment, the circuit $t_1$ comprising a parallel combination of a secondary inductor winding 16 and a capacitor 18, one terminal of the combination being grounded and the other terminal being connected to the anode of a diode 20. The circuit $t_2$ similarly comprises a secondary inductor winding 17 connected in parallel with a capacitor 19, the parallel combination having one terminal grounded and the other terminal connected to the cathode of a diode 21. The cathode of the diode 20 is connected to the anode of the diode 21 through serially connected substantially equal resistors 22 and 23, and the juncture of the resistors 22 and 23 is grounded through a parallel combination of a resistor 24 and a capacitor 28. A diode 25, having its anode connected to the junction of the resistors 22 and 23, has its cathode connected to an output terminal 30 to which one terminal of a parallel combination of a capacitor 26 and a resistor 27 is also connected. The other terminal of the parallel combination is connected to ground.

Figure 3:
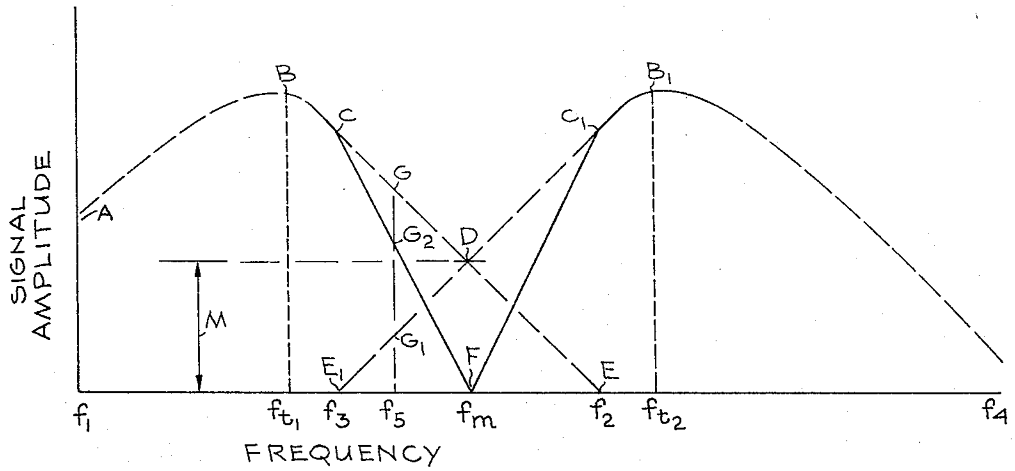
FIG. 3 is a diagram helpful in explaining the novel features of the invention.

The operation of the circuit of FIG. 2 can best be explained by referring to FIG. 3, wherein the frequency transmission characteristics of the tank circuits $t_1$ and $t_2$ in response to an input signal are represented by the dashed curved lines ABCGDE and $A_1B_1C_1DG_1E_1$, respectively. The two tuned circuits are assumed to be tuned to the frequencies $f_{t1}$ and $f_{t2}$. Assume now that an input signal is provided across the primary winding 13 (FIG. 2). As is well known in the art, the mutual inductance between the primary and secondary windings will cause signals of the same frequency as the input signal to be induced in the secondary windings 16 and 17, the amplitudes of the induced signals being a function of the self inductances of the primary and secondary windings and the mutual inductance therebetween. However, the amplitudes of the output signals of the tank circuits and consequently such rectified output signals will depend on the respective transmission characteristics of the respective tank circuits. Because of the diodes 20 and 21, only that portion of each signal cycle when the diodes are forward biased will cause current through the resistors 22 and 23. Assume first that an input signal of a frequency $f_m$ (FIG. 3) is impressed across the input winding 13 (FIG. 2). It is clear from observing FIG. 3 that the coincident output signals of both tank circuits in response thereto will be of equal amplitude M as indicated by the point D on their respective transmission characteristic curves, but of opposite polarity due to the diodes 20 and 21 (FIG. 2), resulting in equal signals of opposite polarity being produced across the equal resistors 22 and 23 at points X and Y, respectively. This will result in a net zero signal amplitude at point Z. The zero output signal is indicated in FIG. 3 by the letter "F" at the frequency $f_m$.

As the frequency of the input signal to the input winding 13 (FIG. 2) varies between values of $f_m$ and $f_3$ (FIG. 3), the respective rectified positive and negative output signals of the tank circuits $t_1$ and $t_2$ are not of equal amplitudes, but, rather, have different values as indicated in FIG. 3 by the respective transmission characteristic curves of the two tank circuits. For example, with an input signal of frequency $f_5$, the rectified output signal of the tank circuit $t_1$ is designated "G," while the rectified output of the tank circuit $t_2$ is designated "$G_1$". The two unequal rectified signals of opposite polarities are impressed across the equal resistors 22 and 23, resulting in a signal of amplitude $G_2$ (FIG. 3) at point Z (FIG. 2) which is of positive polarity since it is assumed that the rectified positive output signal G from the circuit $t_1$ is greater than the rectified negative output signal $G_1$ from the circuit $t_2$. The positive signal $G_2$ at point Z will pass through the diode 25, which is connected to pass positive signals only, and then will be smoothed by the combination of capacitor 26 and resistor 27, in a manner well known in the art. Further study of FIG. 3 reveals that the presence of the tank circuit $t_2$ will affect the transmission characteristics of the system only for frequencies above $f_3$, since below that frequency the output signal of the tank circuit $t_2$ is zero and produces no effect. Therefore, it is clear that the frequency cutoff sharpness of the system is greatly increased, since the rate of attenuation indicated by line $CG_2F$ is greater than the previous rate of attenuation indicated by the line portion CGDE. Further, it should be apparent that in the arrangement shown in FIG. 2, no signal will be present at the output terminal 30 for all frequencies above $f_m$ since all such frequencies will produce a rectified negative output signal from the tank circuit $t_2$ which is greater than a rectified positive output signal of the tank circuit $t_1$, resulting in a rectified signal at point Z of a negative polarity which is blocked from the terminal 30 by the high resistance orientation of the diode 25.

From the foregoing description, it is apparent that the arrangement shown in FIG. 2 produces a positive direct current output signal whose amplitude varies as indicated by the curve $ABCG_2F$ (FIG. 3) in response to input signals of frequencies from $f_1$ to $f_m$. For all input signals of frequencies above $f_m$, the output signal is substantially zero. In the absence of the arrangement, the tank circuits $t_1$ and $t_2$ would have transmitted frequencies as indicated by their respective characteristic curves shown in FIG. 3, each curve having considerably less sharp frequency cutoffs than curve $ABCG_2F$ referred to above.

Figure 4:
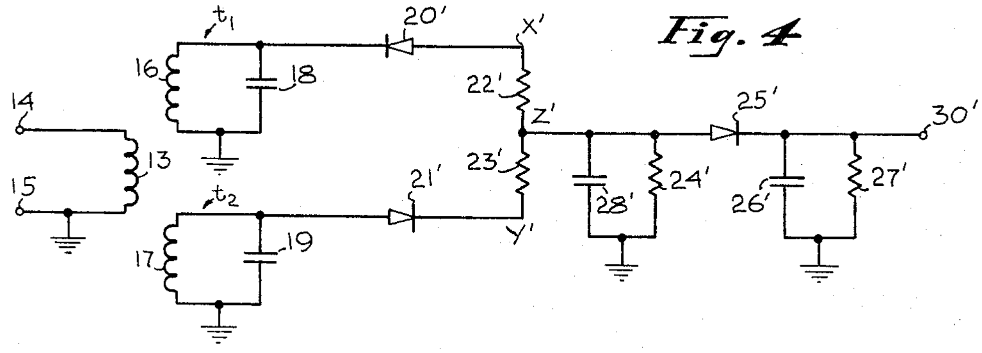
FIG. 4 is a schematic diagram of another embodiment of the invention.

Another embodiment of the present invention, shown in FIG. 4, comprises an arrangement similar to FIG. 2, except for the directional orientation of the diodes 20' and 21' being opposite to that of the diodes 20 and 21 of FIG. 2. In light of the above explanation, it is apparent that in this arrangement a positive direct current output signal of a varying amplitude will be present at the output terminal 30 for all input signal frequencies between $f_m$ and $f_4$ (FIG. 3), while the absence of an output signal will indicate an input signal of frequencies below $f_m$.

Figure 5:
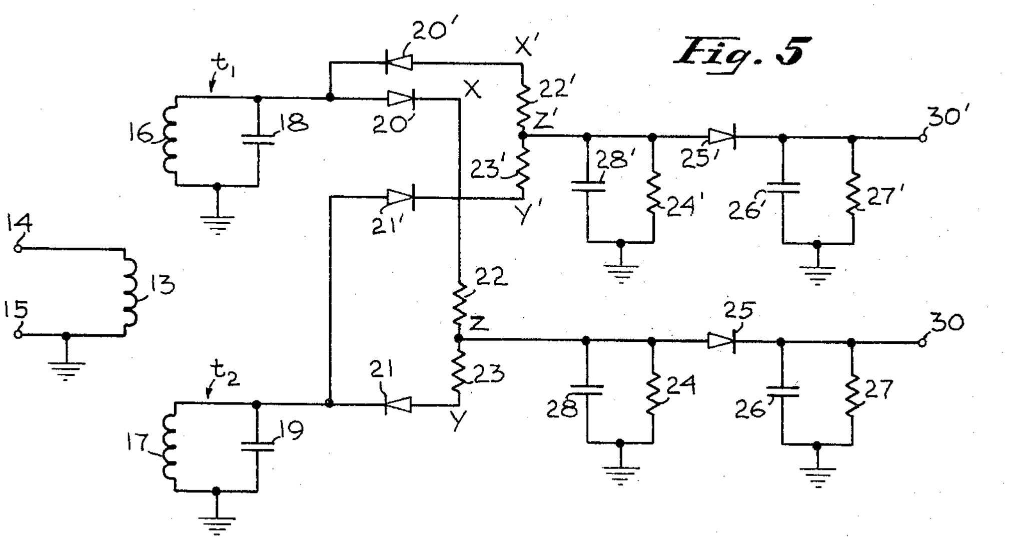
FIG. 5 is a schematic diagram of an embodiment combining the features shown in FIGS. 2 and 4.

Still another embodiment of the invention comprises an arrangement as shown in FIG. 5, which in essence combines the arrangements shown in FIGS. 2 and 4, so that a positive direct current output signal is produced at the output terminal 30 in response to an input signal of frequencies below $f_m$, while a distinctly separate positive direct current output signal is produced at the output terminal 30' in response to an input signal of frequencies above $f_m$. The reference numerals used in FIG. 5 are the same as those used for corresponding parts in FIGS. 2 and 4. Therefore, a detailed description of the structure of the embodiment shown in FIG. 5 is believed to be unnecessary.

Analysis of the arrangement shown in FIG. 5 reveals that while an input signal of a frequency below $f_m$ (FIG. 3) produces a positive direct current output signal at point X, a smaller direct current output signal but of a negative polarity is produced by the tank circuit $t_2$ and will appear at point Y. The magnitudes of these direct current output signals are dependent on the selectivity characteristics of the tank circuits $t_1$ and $t_2$ as explained hereinbefore. For all input signal frequencies below $f_m$, the positive direct current signal at point X will be greater than the negative direct current signal at point Y, resulting in a positive direct current signal at point Z. As the frequency of the input signal increases and approaches $f_m$, the output of the tank circuit $t_1$ decreases, resulting in a decrease in the magnitude of the positive direct current signal at point X, while the output of the tank circuit $t_2$ increases resulting in an increase in the magnitude of the negative direct current signal at point Y. As a result of such changes in magnitudes, the magnitude of the positive direct current signal at point Z decreases, its magnitude becoming zero at an input frequency of $f_m$. As the input frequency increases above $f_m$, the negative output from the tank circuit $t_2$ through the diode 21 exceeds the positive output from the tank circuit $t_1$ through the diode 20 resulting in a negative direct current signal at point Z. However, such a negative direct current signal is blocked from the terminal 30 because of back biasing of the diode 25.

Similarly it is seen that the magnitude of the positive direct current signal at terminal 30' is a function of the output signals of the two tank circuits $t_1$ and $t_2$ which are rectified by the diodes 20' and 21', respectively, and added by the adding circuitry comprising resistors 22' and 23'. The output signal of the adding circuitry (at point Z') is further rectified and filtered by the diode 25', resistors 24' and 27' and the capacitors 26' and 28'.

Figures 6, 7, 8:
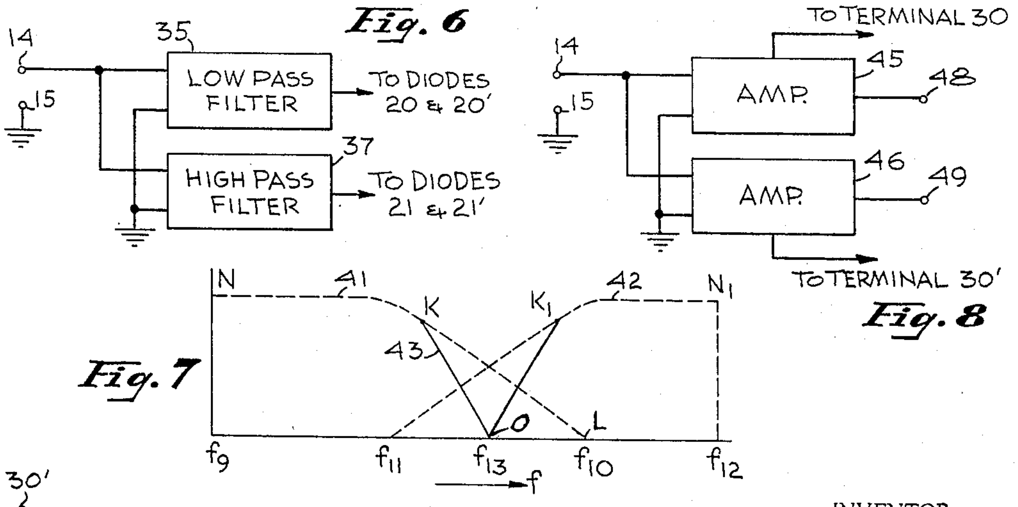
FIG. 6 is a block diagram of another embodiment of the invention.
FIG. 7 is a waveshape diagram useful in explaining a particular feature of the invention.
FIG. 8 is a block diagram of still another embodiment of the invention.

In another embodiment of the present invention the tank circuits $t_1$ and $t_2$ and the input winding 13 previously described are replaced by an arrangement as shown in FIG. 6, wherein an input signal on input terminal 14 is passed to a low-pass filter 35 and to a high-pass filter 37. The output signals of the filters are connected to the diodes as indicated, producing combined output signals whose amplitudes are functions of the frequencies of the input signals as previously explained.

Reference is now made to FIG. 7 wherein typical transmission characteristics of the low-pass filter 35 and the high-pass filter 37, as designated by dashed lines 41 and 42, respectively, are shown. From the foregoing description, it is clear that, according to the teachings of the invention, output signals of frequency-dependent amplitude may be produced, the rate of change of amplitude as a function of input signal frequency being greater than the rate of change provided by the individual filter circuits incorporated in the novel arrangements of the invention. For example, the apparent cutoff sharpness of the low-pass filter 41 may be increased, as shown in FIG. 7 by the solid line 43 which represents a higher rate of signal attenuation than the section KL of the dashed line 41.

In still another embodiment of the present invention, the filters 35 and 37 of FIG. 6 are replaced by two band-pass filters (not shown) passing signals in two distinct frequency bands, the operating principles of this arrangement being identical to those already described except that the amplitudes of output signals of this arrangement will depend on the transmission characteristics of the band-pass filters rather than the transmission characteristics of the low-pass and high-pass filters previously referred to.

In all of the described embodiments of the present invention, the direct current output signals at the output terminals 30 or 30' are referred to as positive signals. Such reference resulted from the directional orientation of the diodes 25 and 25' which, as shown in FIGS. 2, 4 and 5, pass signals to the output terminals 30 or 30' only when they are forward biased by positive signals at the points Z or Z'. However, it is apparent that negative direct current output signals in response to an input signal of varying frequencies may be produced by reversing the polarities of the diodes 25 and 25'. For example, by reversing the connection of the diode 25' shown in FIG. 4, a negative output signal of the tank circuit $t_1$, which is greater than a positive output signal of the tank circuit $t_2$, will cause a negative signal to be present at point Z', which will forward bias the diode 25' so that a negative direct current output signal will appear at the output terminal 30'. It should further be apparent that the direct current output signals, whether of positive or negative polarity with respect to ground, may be either voltage or current signals depending on whether the output terminals 30 and 30' are shunted to ground through a high or a low resistance; either type of signal is within the contemplation of this invention.

The direct current output signals, whose amplitudes are functions of the input signal frequencies, may be utilized in various system control methods known in the art, such as for actuating relays or other circuits. Whenever necessary, amplitude limits of the direct current signals may readily be obtained by connecting appropriate Zener diodes (not shown) between the output terminals and ground, or by using any other type of well known signal regulators.

The direct current output signals may further be used to control the operation of conventional gating means or amplifiers so that the amplitudes of the amplifier or gating means output signals are frequency dependent on their input signals. For example, the direct current output signals at terminals 30 and 30' (FIG. 5) may be supplied to control by known conventional biasing methods the operation of amplifiers 45 and 46, respectively, shown in FIG. 8. Both amplifiers are driven from the input signal at terminal 14. Assuming that the amplifiers 45 and 46 are wide-band amplifiers capable of equally amplifying all frequencies of the input signals under consideration, the amplitudes of the output signals thereof appearing at output terminals 48 and 49, respectively, may be made to be dependent on the amplitudes of the controlling signals from terminals 30 and 30'. Let us assume, for example, that the input signal at terminal 14 contains all frequencies between a low frequency $f_9$ and a high frequency $f_{12}$, which are diagrammatically indicated in FIG. 7, and let it further be assumed that the input signal coincidently drives arrangements as shown in FIGS. 6 and 8. Then, the output signal of amplifier 45 (FIG. 8) at output terminal 48 will contain all frequencies between $f_9$ and $f_{13}$, their relative amplitudes being represented by the curved line NKO, and the output signal of the amplifier 46 at output terminal 49 will contain frequencies between $f_{13}$ and $f_{12}$, their relative amplitudes being represented by the curve $OK_1N_1$.

It is apparent that the output signals at terminals 48 and 49 may be combined to produce a single output signal containing all frequencies from $f_9$ to $f_{12}$ with their relative amplitudes being represented by the curve $NKOK_1N_1$. Such an arrangement produces a relatively sharp notch filter in the frequency range between $f_{11}$ and $f_{10}$. All of the signals amplified by the amplifiers 45 and 46 appear at the output terminals with a minimum of phase shift since all of the frequency discriminating circuitry is external to the path of the frequency-varying amplified signal. The signals at terminals 48 and 49 will contain only frequencies below and above $f_{13}$, respectively. Regardless of how close the frequencies may be to $f_{13}$, they will appear at only one or the other terminal, depending on whether they are above or below $f_{13}$. By utilizing the output signal at terminal 48 only, the system performs as a sharp cutoff low-pass filter and, similarly, a sharp cutoff high-pass filter is attained by using the output signal at terminal 49 only.

Figure 9:
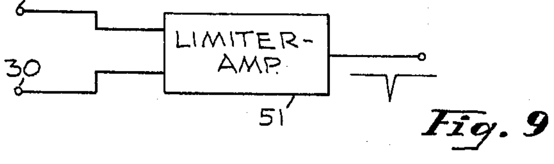
FIG. 9 is a block diagram of an arrangement to increase the selectivity of the embodiment shown in FIG. 5.

The high frequency selectivity which is accomplished through the teachings of the present invention may be further increased by supplying the output signals at terminals 30 and 30' (FIG. 5) to limiting and amplifying circuitry 51 as shown in FIG. 9. This produces even a sharper notch type filter than heretofore described.

From the foregoing, it should be apparent that the invention provides novel arrangements adapted to increase the cutoff sharpness of networks comprising low Q components having known frequency transmission characteristics. Similarly, the arrangements shown herein may incorporate networks comprising high Q components which initially have relatively sharp cutoffs. However, by operating them as disclosed herein, their cutoff sharpness may further be increased. This ability to increase the cutoff sharpness of frequency selective networks arises by virtue of combining output signals of opposite polarities from two individual networks coincidently energized.

It is apparent that the invention provides systems which have many applications, and it is therefore intended not to be limited by the specific embodiments shown or described, which were presented for explanatory purposes only. Various changes and modifications both in selection of components and circuitry configurations may be made by one skilled in the art without departing from the true spirit and scope of the invention.

The embodiments of the invention in which an exclusive property or privilege is claimed are defined as follows:

1. A frequency sensitive system comprising:
first circuit means having a first frequency passband and responsive to an alternating current input signal for producing a first signal when a frequency of said input signal is within said first frequency passband;
second circuit means having a second frequency passband and responsive to said input signal for producing a second signal when said frequency of said input signal is within said second frequency passband;
rectifying means for rectifying said first signal to produce a first rectified signal of positive polarity and for rectifying said second signal to produce a second rectified signal of negative polarity;
adding means for adding said first rectified signal and said second rectified signal to produce a summation signal;
means responsive to said summation signal for producing a direct current output signal of predetermined polarity whose characteristics are functions of said first and second frequency passbands of said first and second circuits means and of said frequency of said alternating current input signal; and
gating means responsive to said alternating current input signal and to said direct current output signal for producing an alternating current output signal whose characteristics are functions of said first and second frequency passbands of said first and second circuit means and of said frequency of said alternating current input signal.

2. The system defined by claim 1 wherein at least one of said first and second circuit means comprises a tuned tank circuit with predetermined cutoff characteristics, whereby the cutoff characteristics of said frequency sensitive system are greater than the cutoff characteristics of said tuned circuit.

3. The system defined by claim 1, wherein said gating means comprise alternating current amplifying means and said first circuit means comprises a low pass filter of a preselected cutoff, whereby said system defines a low pass filter with a cutoff sharper than the cutoff of said first circuit means.

4. A frequency sensitive filter comprising:
first circuit means having a first frequency passband and responsive to an alternating current input signal for producing a first alternating current signal when a frequency of said input signal is within said first frequency passband;
second circuit means having a second frequency passband and responsive to said input signal for producing a second alternating current signal when said frequency of said input signal is within said second frequency passband;
first rectifying means for rectifying said first alternating current signal to produce first and second rectified signals of positive and negative polarities, respectively;
second rectifying means for rectifying said second alternating current signal to produce third and fourth rectified signals of positive and negative polarities, respectively;
first adding means for adding said first and fourth rectified signals and producing a first summation signal;
second adding means for adding said second and third rectified signals and producing a second summation signal; and
unidirectionally conducting means responsive to said first and second summation signals for producing first and second direct current output signals of positive polarity whose characteristics are functions of said first and second frequency passbands of said first and second circuit means and of said frequency of said alternating current input signal.

5. The frequency sensitive filter defined by claim 4, including gating means responsive to said alternating current input signal and to said first and second direct current output signals for producing first and second alternating current output signals whose characteristics are functions of said first and second frequency passbands of said first and second circuit means and of said frequency of said alternating current input signal.

6. The frequency filter defined by claim 4, wherein said first and second circuit means comprise two tuned tank circuits.

7. The frequency filter defined by claim 5, wherein said gating means comprise alternating current amplifying means.

8. A frequency selective filter comprising:
first circuit means having a first frequency passband and responsive to an input signal for producing a first signal when a frequency of said input signal is within said first frequency passband;
second circuit means having a second frequency passband and responsive to said input signal for producing a second signal when said frequency of said input signal is within said second frequency passband of said second circuit means;
first rectifying means for rectifying said first signal and producing a third signal of one polarity;
second rectifying means for rectifying said second signal and producing a fourth signal of opposite polarity to said one polarity;
adding means for adding said third and fourth signals and producing a summation signal;
means responsive to said summation signal for producing a direct current output signal of positive polarity whose characteristics are functions of said first and second frequency passbands of said first and second circuit means and of said frequency of said alternating current input signal; and
alternating current amplifying means responsive to said alternating current input signal and to said direct current output signal for producing an alternating current output signal whose characteristics are functions of said first and second frequency passbands of said first and second circuit means and of said frequency of said alternating current input signal.

9. The filter defined by claim 8 wherein said first and second circuit means comprise a low-pass filter and a high-pass filter, respectively of predetermined cutoffs, said frequency selective filter having a cutoff greater than the cutoff of either of said circuits.

10. A frequency selective filter comprising:

first circuit means having a first frequency passband and responsive to an input signal for producing a first signal when a frequency of said input signal is within said first frequency passband;

second circuit means having a second frequency passband and responsive to said signal for producing a second signal when said frequency of said input signal is within said second frequency passband of said second circuit means;

first rectifying means for rectifying said first signal and producing third and fourth signals of positive and negative polarities, respectively;

second rectifying means for rectifying said second signal and producing fifth and sixth signals of positive and negative polarities, resectively;

first adding means for adding said third and sixth signals and producing a first summation signal;

second adding means for adding said fourth and fifth signals and producing a second summation signal; and unidirectionally conducting means responsive to said first and second summation signals for producing first and second direct current output signals of like polarity, whose characteristics are functions of said first and second frequency passbands of said first and second circuit means and of said frequency of said alternating current input signal.

11. The filter defined by claim 10 including gating means responsive to said alternating current input signal and to said first and second direct current output signals for producing first and second alternating current output signals whose characteristics are functions of said first and second frequency passbands of said first and second circuit means and of said frequency of said alternating current input signal.

12. The filter defined by claim 10, wherein said first and second circuit means comprise a low-pass filter and a high-pass filter, respectively.

13. The filter defined by claim 10 further including:

means for limiting said first and second direct current output signals so as to pass only the portions of said signals which are below a predetermined level; and means for amplifying said portions of said first and second direct current output signals.

14. The filter defined by claim 11, wherein said first and second circuit means comprise a high-pass filter and a low-pass filter, respectively.

15. The filter defined by claim 11, wherein said gating means comprise alternating current amplifying means.

References Cited by the Examiner

UNITED STATES PATENTS

| | | | |
|---|---|---|---|
| 2,773,181 | 12/1956 | Singel | 329—141 X |
| 2,838,673 | 6/1958 | Fernsler et al. | 329—142 X |
| 2,858,422 | 10/1958 | Reyburn et al. | 329—140 X |
| 2,941,075 | 6/1960 | Christian | 329—142 X |
| 3,076,940 | 2/1963 | Davis et al. | 329—142 X |

ROY LAKE, *Primary Examiner.*

A. L. BRODY, *Assistant Examiner.*

UNITED STATES PATENT OFFICE

CERTIFICATE OF CORRECTION

Patent No. 3,281,701 October 25, 1966

Joel H. Axe

It is certified that error appears in the above identified patent and that said Letters Patent are hereby corrected as shown below:

Column 9, line 10, after "said" insert -- input --.

Signed and sealed this 2nd day of September 1969.

(SEAL)
Attest:

Edward M. Fletcher, Jr.
Attesting Officer

WILLIAM E. SCHUYLER, JR.
Commissioner of Patents